United States Patent
Lee et al.

(10) Patent No.: US 11,321,589 B2
(45) Date of Patent: May 3, 2022

(54) APPARATUS AND METHOD FOR GENERATING MEDICAL IMAGE SEGMENTATION DEEP-LEARNING MODEL, AND MEDICAL IMAGE SEGMENTATION DEEP-LEARNING MODEL GENERATED THEREFROM

(71) Applicants: Seoul National University R&DB Foundation, Seoul (KR); hodooAI Lab Inc., Seoul (KR)

(72) Inventors: Jungwoo Lee, Seoul (KR); Sungyeob Han, Seoul (KR); Yeongmo Kim, Seoul (KR); Seokhyeon Ha, Seoul (KR)

(73) Assignees: Seoul National University R&DB Foundation, Seoul (KR); hodooAI Lab Inc., Seoul (KR)

(*) Notice: Subject to any disclaimer, the term of this patent is extended or adjusted under 35 U.S.C. 154(b) by 0 days.

(21) Appl. No.: 16/706,663

(22) Filed: Dec. 6, 2019

(65) Prior Publication Data

US 2020/0184274 A1    Jun. 11, 2020

(30) Foreign Application Priority Data

Dec. 7, 2018    (KR) .................... 10-2018-0157455

(51) Int. Cl.
*G06T 7/00*    (2017.01)
*G06T 7/10*    (2017.01)
(Continued)

(52) U.S. Cl.
CPC ......... *G06K 9/6262* (2013.01); *G06K 9/6256* (2013.01); *G06N 3/08* (2013.01);
(Continued)

(58) Field of Classification Search
CPC .................... G06T 7/0012; G06T 7/10; G06T 2207/20084; G06T 2207/20081;
(Continued)

(56) References Cited

U.S. PATENT DOCUMENTS

2018/0060722 A1    3/2018    Hwang et al.
2018/0144244 A1    5/2018    Masoud et al.
(Continued)

FOREIGN PATENT DOCUMENTS

KR    10-2011-0138850 A    12/2011
KR    10-2018-0025093 A    3/2018
(Continued)

OTHER PUBLICATIONS

Notice of Allowance dated Mar. 31, 2021 for Korean Application No. 10-2018-0157455.

*Primary Examiner* — Jon Chang (57) ABSTRACT

There is provided a medical image segmentation deep-learning model generation apparatus including a training data generation/allocation unit configured to generate a training dataset through a segmentation result value acquired by inputting a given medical image to an original medical image segmentation deep-learning model and a learning control unit configured to acquire temporary weights using output data corresponding to primary learning by inputting good task data and bad task data sampled from primary learning training datasets to the medical image segmentation deep-learning model and configured to update weights by adding gradients acquired using weights acquired using output data corresponding to secondary learning by inputting good task data and bad task data sampled from secondary learning training datasets to the medical image segmentation deep-learning model, wherein the primary learning and the secondary learning are repeated.

4 Claims, 6 Drawing Sheets

(51) Int. Cl.
  *G06T 7/11* (2017.01)
  *G06N 3/08* (2006.01)
  *G06K 9/62* (2022.01)

(52) U.S. Cl.
  CPC .............. *G06T 7/0012* (2013.01); *G06T 7/10* (2017.01); *G06T 7/11* (2017.01); *G06T 2207/10081* (2013.01); *G06T 2207/10088* (2013.01); *G06T 2207/20081* (2013.01); *G06T 2207/20084* (2013.01); *G06T 2207/30016* (2013.01)

(58) Field of Classification Search
  CPC . G06T 2207/10081; G06T 2207/10088; G06T 2207/30016; G06T 7/11; G06N 3/08; G06K 9/6262; G16H 30/40; G16H 50/70; G16H 50/20; G06V 2201/03
  See application file for complete search history.

(56) References Cited

U.S. PATENT DOCUMENTS

2018/0260957 A1* 9/2018 Yang ..................... G06T 7/0012
2020/0151507 A1* 5/2020 Siemionow .......... A61B 5/4566
2021/0209766 A1* 7/2021 Cho ......................... G06N 3/08

FOREIGN PATENT DOCUMENTS

KR  10-1864412 B1  5/2018
KR  10-1828503 B1  8/2018

* cited by examiner

APPARATUS AND METHOD FOR GENERATING MEDICAL IMAGE SEGMENTATION DEEP-LEARNING MODEL, AND MEDICAL IMAGE SEGMENTATION DEEP-LEARNING MODEL GENERATED THEREFROM

CROSS-REFERENCE TO RELATED APPLICATION(S)

This application claims priority from Korean Patent Application No. 10-2018-0157455, filed on Dec. 7, 2018, in the Korean Intellectual Property Office, the disclosure of which is incorporated herein by reference in its entirety.

BACKGROUND

1. Field

The following description relates to a medical image classification technique, and more particularly, to a technique for classifying medical images based on deep learning.

2. Description of Related Art

Along with the development of deep learning technology, an automatic image segmentation technique has been advanced and become applicable to a medical image auto-segmentation technique. Recently, Magnetic Resonance Imaging (MRI) and medical imaging technology have advanced, and early diagnosis is becoming important for the treatment of diseases like brain tumors. Thus, a medical image auto-segmentation technique can help doctors by significantly reducing a burden of reading a large number of medical images. However, in the case of medical image segmentation using artificial intelligence, segmentation answer information on tumor, edema, necrosis, and normal lesions for each image is necessary. In this case, it is difficult to collect medical images of corresponding diseases, and it is costly and time-consuming to produce medical images through doctors.

Also, for example, in the case of brain tumors, there are a variety of types, such as primary and metastatic cancers, and each cancer has a different structural appearance in images, Thus, an artificial neural network trained based on one type of cancer does not segment medical images of other types of cancers well. In the case of brain tumors, primary and metastatic cancers have almost the same pattern on MR images, but there is a small difference according to the characteristics of each cancer. Because of the difference, an auto-segmentation artificial-neural-network recognizes that primary and metastatic cancers are different from each other, and thus an artificial neural network trained based on primary cancers does not segment a cancer in a metastatic cancer image well.

In order to facilitate segmentation of metastatic cancer through a conventional fine-tuning method to solve this problem, as much new metastatic cancer image and answer information are needed as the amount of primary cancer data. Accordingly, such an expandable method has no benefit in terms of data compared to a method of creating and learning new metastatic cancer data from the beginning. Primary brain cancer has a dataset called the BRaTs DATASET, which indicates MRI images and answer datasets regarding 150 or more patients, but metastatic brain cancer does not have reliable datasets. Accordingly, it is known that it is actually impossible to extend an automatic image segment technique using a conventional artificial neural network into an automation technique for any diseases.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a medical image segmentation deep-learning model generation apparatus and method capable of expanding from a conventional artificial neural network for primary cancer segmentation to an artificial neural network for metastatic cancer segmentation when only some reliable pieces of data can be secured, and a medical image segmentation deep-learning model generated using the same.

The following description also relates to a medical image segmentation deep-learning model generation apparatus and method capable of accumulating segmentations for new patterns without losing capability for patterns that may currently be segmented well, and a medical image segmentation deep-learning model generated using the same.

In one general aspect, there is provided a medical image segmentation deep-learning model generation apparatus including a training data generation/allocation unit configured to generate a training dataset through a segmentation result value acquired by inputting a given medical image to an original medical image segmentation deep-learning model and a learning control unit configured to acquire temporary weights using output data corresponding to primary learning by inputting good task data and bad task data sampled from primary learning training datasets to the medical image segmentation deep-learning model and configured to update weights by adding gradients acquired using weights acquired using output data corresponding to secondary learning by inputting good task data and bad task data sampled from secondary learning training datasets to the medical image segmentation deep-learning model, wherein the primary learning and the secondary learning are repeated.

In another general aspect, there is provided a medical image segmentation deep-learning model generation method including generating a training dataset through a segmentation result value acquired by inputting a given medical image to an original medical image segmentation deep-learning model, sampling good task data and bad task data from primary learning training datasets, acquiring temporary weights using output data corresponding to primary learning by inputting the good task data and the bad task data to the medical image segmentation deep-learning model, sampling good task data and bad task data from secondary learning training datasets, and updating weights by adding gradients acquired using weights acquired using output data corresponding to secondary learning by inputting the good task data and the bad task data to the medical image segmentation deep-learning model, wherein the sampling and the updating are sequentially repeated.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, a medical image segmentation deep-learning model generation apparatus and method and a medical image segmentation deep-learning model generated using the same will be described below in detail with reference to the accompanying drawings. Here, the same reference numerals are used for the same components, and repetitive descriptions and detailed descriptions related to well-known functions or elements will be omitted in order not to unnecessarily obscure subject matters of the present invention. The embodiments of the present invention are provided to describe the present invention more fully to those skilled in the art. Accordingly, in the accompanying drawings of the present invention, shapes and dimensions of components may be exaggerated for clarity.

The combinations of the blocks of the block diagram and the operations of the flowchart may be performed by computer program instructions (execution engines), and these computer program instructions may be provided to a processor of a general purpose computer, a special purpose computer, or another programmable data processing apparatus so that the instructions, which are executed via a processor of a computer or another programmable data processing apparatus, create a means for performing the functions specified in the blocks of the block diagram or the operations of the flowchart.

These computer program instructions may also be stored in a computer readable storage medium that can direct a computer, a programmable data processing apparatus, and/or other devices to function in a particular manner so that the computer readable storage medium having instructions stored therein comprises an article of manufacture including instructions which implement aspects of the function/act specified in the flowchart and/or block diagram block or blocks.

The computer program instructions may also be loaded onto a computer, other programmable data processing apparatus, or other device to cause a series of operational steps to be performed on the computer, other programmable apparatus or other device to produce a computer implemented process so that the instructions which are executed on the computer, other programmable apparatus, or other device implement the functions/acts specified in the flowchart and/or block diagram block or blocks.

In this regard, each block in the flowchart or block diagrams may represent a module, segment, or portion of codes which comprises one or more executable instructions for implementing the specified logical function(s). In some alternative implementations, the functions noted in the block or in the operation may occur out of the order noted in the figures. For example, two blocks or operations shown in succession may, in fact, be executed substantially concurrently, or the blocks or the operations may sometimes be executed in the reverse order, depending upon the functionality involved.

Hereinafter, embodiments of the present invention will be described in detail with reference to the accompanying drawings. The present invention may, however, be embodied in different forms and should not be constructed as limited to the embodiments set forth herein. Rather, these embodiments are provided so that this disclosure will be thorough and complete and will fully convey the scope of the present invention to those skilled in the art.

The present invention proposes a technique for improving segmentation performance for new image environments and related diseases by quickly and accurately learning characteristics that are not learned in a medical image on the basis of meta learning and active learning techniques. In the drawings and the following descriptions, a brain tumor MRI image will be described as an example of the medical image. However, this is merely an example to aid in understanding the present invention, and the present invention is not limited thereto. That is, the medical image may be one of various kinds of medical images including a computed radiography (CR) image, a computed tomography (CT) image, an ultrasonic image, and a magnetic resonance image (MRI). Also, in the medical image, a brain is shown as an object, but this is merely an example. The present invention is not limited thereto. That is, the object may include a part of a human body or an animal, for example, blood or an organ such as liver, heart, uterus, brain, breast, and abdomen.

Figure 1:
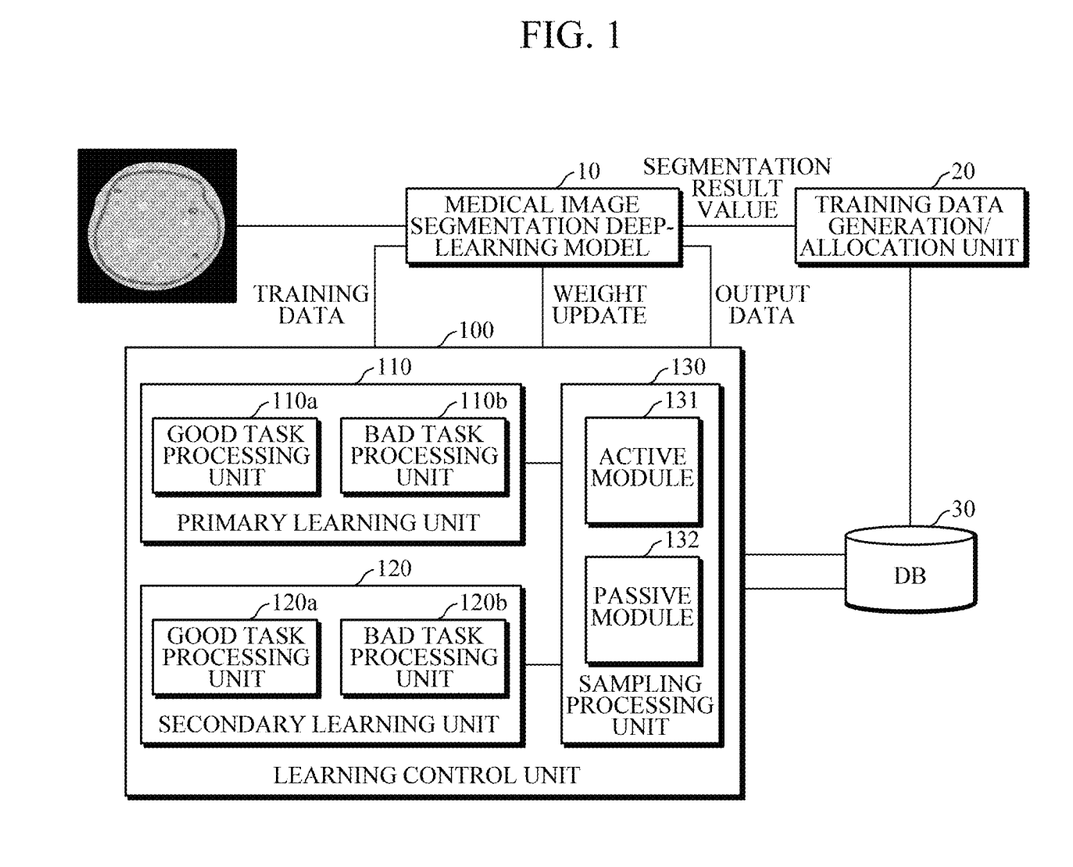
FIG. 1 is a block diagram of a medical image segmentation deep-learning model generation apparatus according to an embodiment of the present invention.
Figure 2:
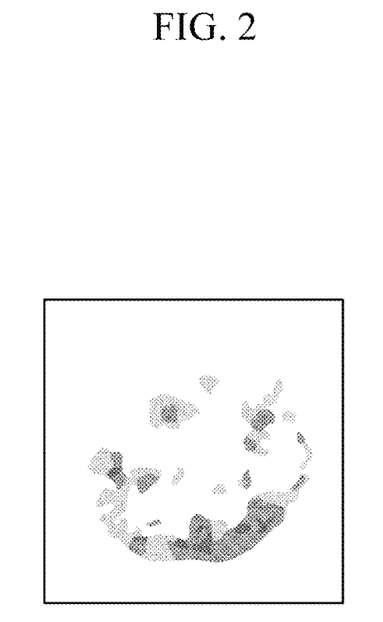
FIG. 2 is a diagram showing an example of an answer segmentation image.

FIG. 1 is a block diagram of a medical image segmentation deep-learning model generation apparatus according to an embodiment of the present invention, and FIG. 2 is a diagram showing an example of an answer segmentation image.

Referring to FIG. 1, the medical image segmentation deep-learning model generation apparatus (hereinafter referred to as an "apparatus") largely includes a medical image segmentation deep-learning model 10, a training data generation/allocation unit 20, a database (DB) 30, and a learning control unit 100. The apparatus may include a computing apparatus including a processor, a memory, and the like.

The medical image segmentation deep-learning model (hereinafter referred to as a "model") 10 is a model to be expanded from an artificial neural network for segmenting primary cancers into an artificial neural network for segmenting metastatic cancers. That is, originally, the model does not segment metastatic cancers well before training is performed by the learning control unit 100. However, after the training is performed, the model is expanded into a model capable of segmenting even metastatic cancers. That is, the extension is achieved so that new patterns may be segmented well without capability for a pattern that may currently be segmented well being lost.

When the model 10 is trained with a segmentation technology, a segmentation target image and an answer image are necessary. This is because training is performed by reducing a difference in result with respect to pixels of a segmentation result image and an answer segmentation image for a medical image that is input to a model before the training for model extension. That is, as shown in FIG. 2, each given pixel has answer labels for edema, cancer, normality, and necrosis, and the labels are collected to form one answer segmentation image. On an image, the labels are represented in different colors. Brown is the area of pixels corresponding to a tumor, yellow is the area of pixels corresponding to edema, green is the area of pixels corresponding to necrosis, and sky blue is the area of pixels corresponding to normality.

Conventionally, in the case of a good task and a bad task, from a given MRI image, a portion predicted to be the same as a correct answer is made by forming a mask using the good task, and pixels predicted to be different from a correct answer are collected and assigned with a correct answer that should have been hit by forming a bad task mask, thereby generating the bad task.

That is, as shown in FIG. 1, a training data generation/allocation unit 20 inputs a given MRI image to a model 10 before expansion so as to acquire a segmentation result value. Then, a pixel having the same prediction value as a correct answer is allocated as a good task pixel, and a pixel that has predicted a wrong answer is allocated as a bad task pixel. Also, the training data generation/allocation unit 20 fills the good task with an MRI image and an original correct answer for the good task pixel to generate a new answer image for the good task. This is to make the model 10 do well what the model 10 did well. Meanwhile, the training data generation/allocation unit 20 fills the bad task with an MRI image and a correct answer for an originally given image, which is a result obtained when bad task pixels should have been properly processed, to generate an answer image for the bad task. This is to make the model 10 do well again what the model 10 did not do well. Accordingly, a pair of the given MRI image and the correct answer is changed into two training data pairs, that is, a pair of the good task image and the correct answer and a pair of the bad task image and the correct answer. Here, the same MRI image is given. This is because the present invention is directed to obtaining better results for the same single image. Also, the training data generation/allocation unit 20 distributes and stores good task training data and bad task training data as primary learning data and secondary learning data in a DB 30, respectively.

Then, the learning control unit 100 performs fine-tuning on the medical image segmentation deep-learning model 10 by training the medical image segmentation deep-learning model 10 with training data that is prepared before the original medical image segmentation deep-learning model 10 and that is stored in the DB 30 and also by applying model agnostic meta learning based on active learning.

Specifically, the learning control unit 100 includes a primary learning processing unit 110 and a secondary learning processing unit 120.

The primary learning processing unit 110, which performs temporary learning processing, inputs training data sampled from the primary learning data stored in the DB 30 to the medical image segmentation deep-learning model 10 and then acquires a temporary weight $\theta_i'$ using the output data. In this case, a good task processing unit 110*a* and a bad task processing unit 110*b* acquire two temporary weights $\theta_i'$ using good task sampling data and bad task sampling data, respectively.

Subsequently, the secondary learning processing unit 120 inputs training data sampled from the secondary learning data stored in the DB 30 to the medical image segmentation deep-learning model 10 updated with the temporary weights $\theta_i'$ and then updates a weight $\theta$ using the output data. In this case, a good task processing unit 120*a* and a bad task processing unit 120*b* update the weight $\theta$ by adding gradients that are acquired using the weights $\theta_i$ acquired using the good task sampling data and the bad task sampling data.

The primary learning processing unit 110 and the secondary learning processing unit 120 repeat the operation until the last training data are completely learned. For example, when ten pieces of training data (D=(x, y), x indicates an image to be trained, and y indicates a correct answer) are given, the training data is assigned to both of the good task training data and the bad task training data. Thus, a total of 20 pieces of training data may be obtained. Also, when ten pieces of the training data are assigned for each of the primary learning and the secondary learning, the primary learning processing unit 110 and the secondary learning processing unit 120 perform weight updates ten times.

Thus, an artificial neural network may classify patterns into patterns already segmented well and patterns not segmented well, sample and learn one pattern already segmented well and one pattern not segmented well, and then balance the learning using data obtained through re-sampling to reach a balanced learning parameter capable of performing even a newly learned portion without forgetting a well done portion.

Meanwhile, the learning control unit 100 may further include a sampling processing unit 130. The sampling processing unit 130 may include at least one of an active module 131 and a passive module 132.

When the active module 131 samples the training data from the DB 80, the sampling order is set in ascending order with respect to performance. A technique applied to meta-learning according to the present invention may be called "Active meta-tune method." When the learning control unit 100 performs learning using "Active meta-tune method," the learning result may be quickly and accurately converged to the balanced learning parameter by performing meta-learning from the learning sample having the worst learning result.

Meanwhile, when the passive module 132 samples the training data from the DB 80, the sampling order is arbitrarily extracted. A technique applied to meta-learning according to the present invention may be called "Passive meta-tune method." When the learning control unit 100 performs learning using "Passive meta-tune method," the learning result performance may not be stable, but a larger number of iterations may yield much better performance.

Figure 3:
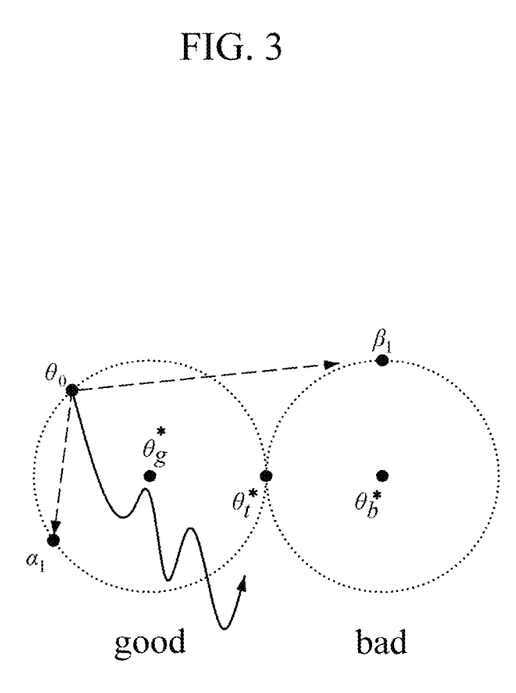
FIG. 3 is a diagram illustrating a passive meta-tune method according to the present invention.
Figure 4:
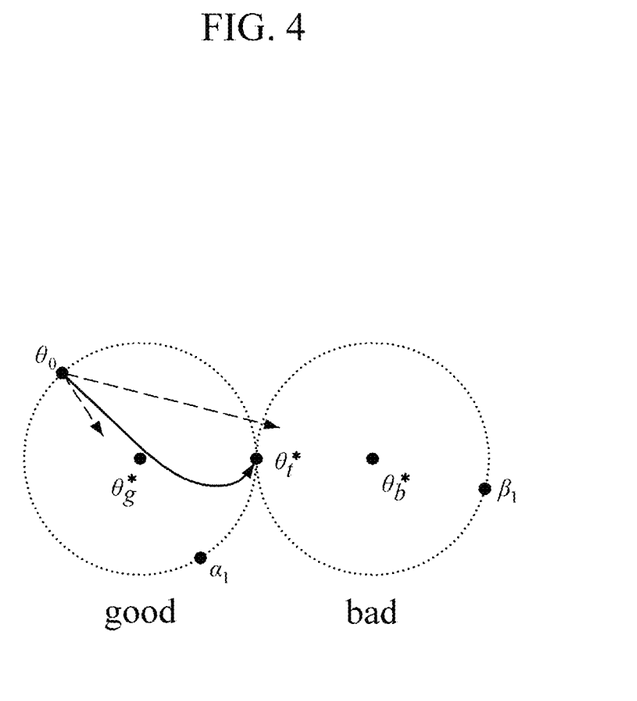
FIG. 4 is a diagram illustrating an active meta-tune method according to the present invention.

FIG. 3 is a diagram illustrating a passive meta-tune method according to the present invention, and FIG. 4 is a diagram illustrating an active meta-tune method according to the present invention.

In FIGS. 3 and 4, $\theta_0$ is a parameter that is pre-trained as a weight value of the model 10 before the learning control unit 100 is operated and that is present in a sub-optimal region of an optimal weight $\theta_g^*$ of a pre-trained good task. In order to reach a target weight $\theta_t^*$, the training data is sampled by the passive meta-tune method and the active meta-tune method.

Referring to FIG. 3, parameters $\alpha_1$ and $\beta_1$ for the sampled good task and bad task are located on a circle in a weight space. Since an update depends on a combination of the optimal parameters $\alpha_1$ and $\beta_1$ the update is performed in a certain direction.

Meanwhile, referring to FIG. 4, since the parameters $\alpha_1$ and $\beta_1$ farthest from $\theta_0$ with respect to parameters $\theta_g^*$ and $\theta_b^*$ in the weight space are sampled as initial input values sampled for the good task and the bad task, the update direction is toward $\theta_t^*$.

Figure 5:
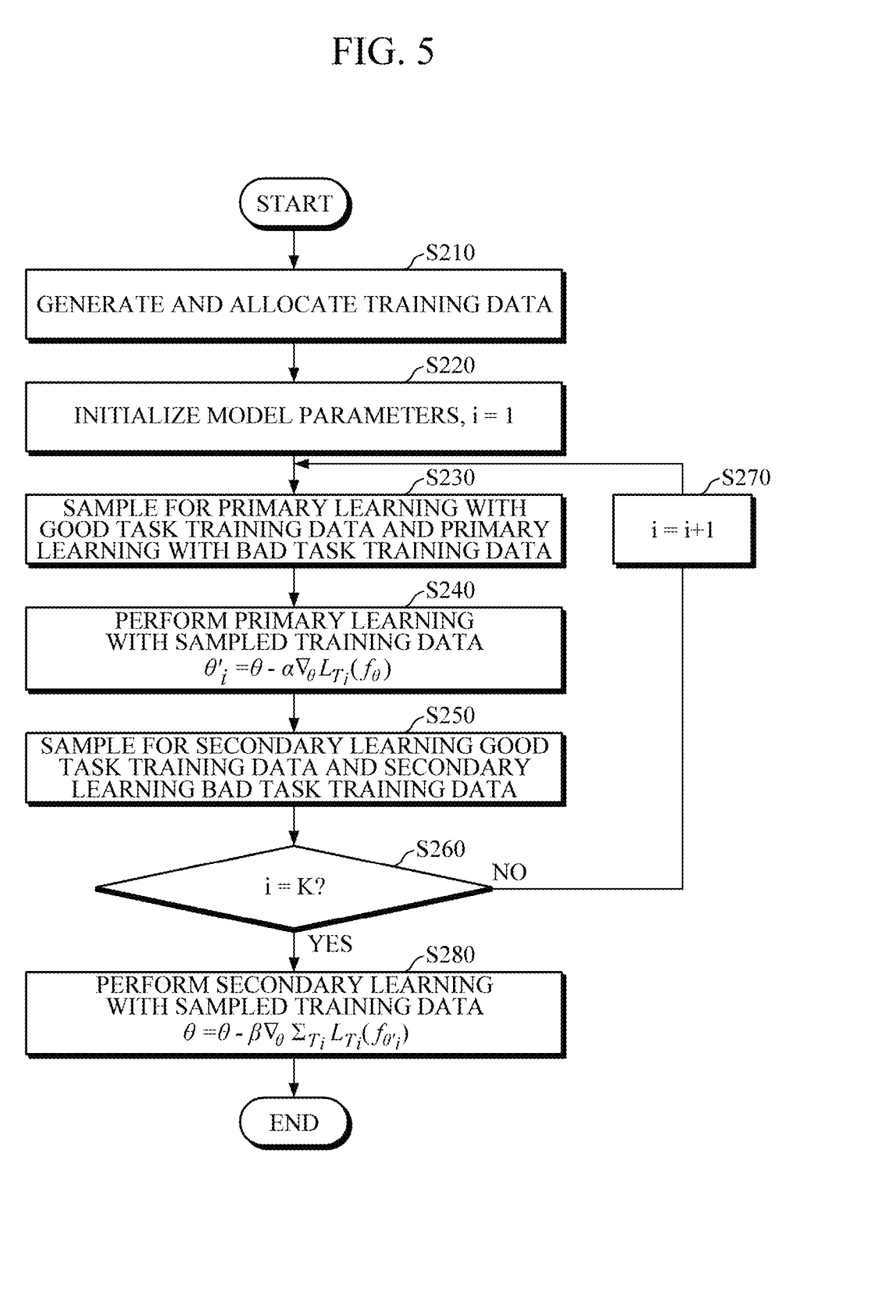
FIG. 5 is a flowchart illustrating a medical image segmentation deep-learning model generation method according to an embodiment of the present invention.

FIG. 5 is a flowchart illustrating a medical image segmentation deep-learning model generation method according to an embodiment of the present invention.

At least a portion of the medical image segmentation deep-learning model generation method may be implemented with program instructions executed in the apparatus.

Referring to FIG. 5, the training data generation/allocation unit 20 of the apparatus prepares training data for expanding the medical image segmentation deep-learning model 10 by generating and allocating training data (S210).

Subsequently, the learning control unit 100 of the apparatus initializes parameters of the original medical image segmentation deep-learning model 10 (S220).

Subsequently, the learning control unit 100 inputs training data sampled from the primary learning data by "Active meta-tune method" or "Passive meta-tune method" and then acquires a temporary weight $\theta_i'$ using the output data (S230 and S240). In this case, the learning control unit 100 acquires two temporary weights $\theta_i'$ using good task sampling data and bad task sampling data.

Then, the learning control unit 100 samples the secondary learning data by "Active meta-tune method" or "Passive meta-tune method" (S250). The learning control unit 100 repeats the operation until the last training data is completely learned (S260 and S270).

Subsequently, the learning control unit 100 inputs the training data to the medical image segmentation deep-learning model 10 updated with the temporary weight $\theta_i'$ and then updates the weight $\theta$ using the output data (S280). In this case, the learning control unit 100 updates the weight $\theta$ by adding gradients that are acquired using the weights $\theta_i'$ acquired using the good task sampling data and the bad task sampling data.

Figure 6:
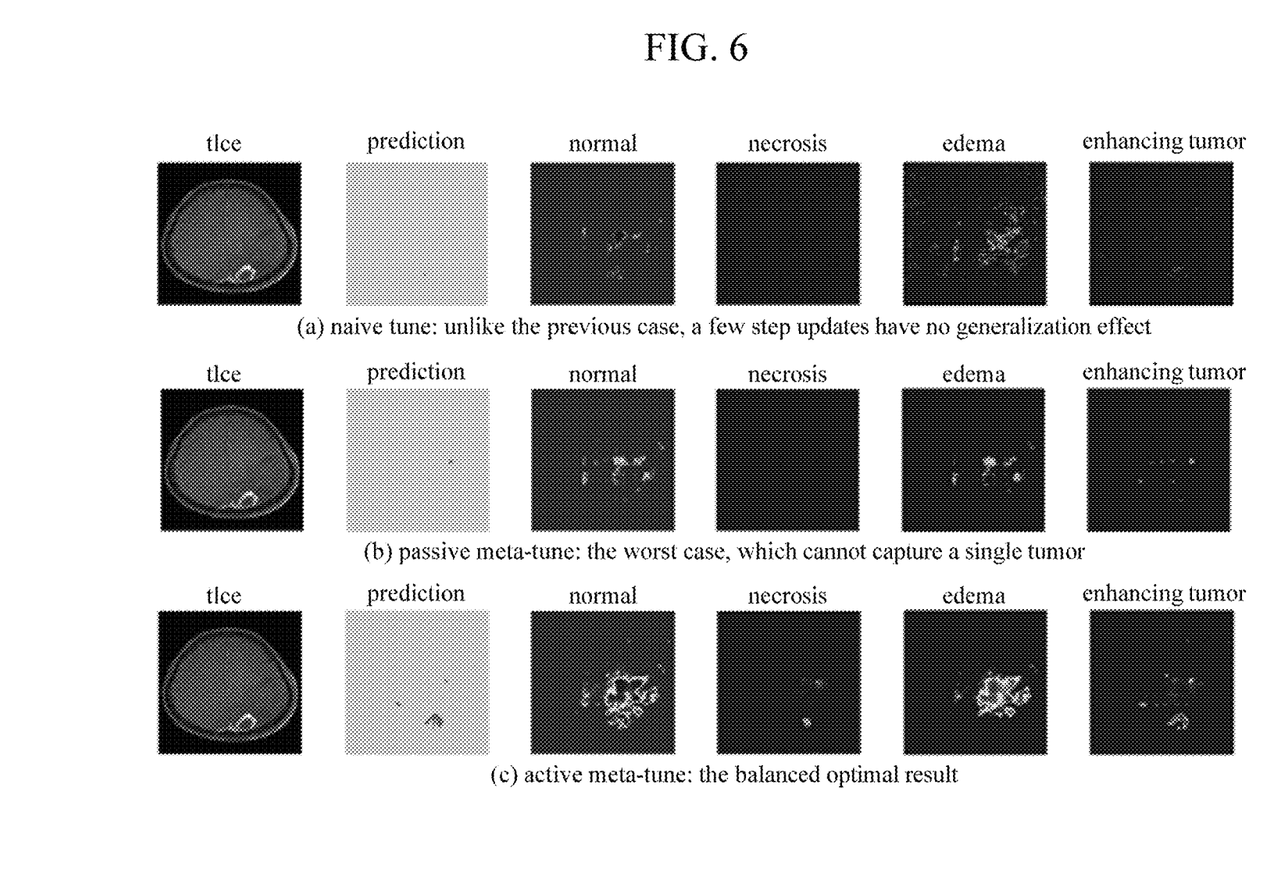
FIG. 6 is an exemplary diagram for comparison of segmentation result performance according to the present invention.

FIG. 6 is an exemplary diagram for comparison of segmentation result performance according to the present invention.

Referring to FIG. 6, in the case of the existing algorithm, a technique of expanding an artificial neural segmentation network to other diseases was not practical, but the technique according to the present invention may be expanded to the entire segmentation of brain metastasis cancer when only reliable data is secured about a patient. Accordingly, it can be said that a fine-tuning technique is practically implemented in the segmentation of medical images.

According to the present invention, it is possible to expand a conventional artificial neural network for primary cancer segmentation to an artificial neural network for metastatic cancer segmentation when only some reliable pieces of data may be secured.

Also, according to the present invention, it is possible to perform fine-tuning using only image information of one patient in order to expand an artificial neural network for primary cancer segmentation to an artificial neural network capable of performing even metastatic cancer segmentation.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A medical image segmentation deep-learning model generation apparatus comprising:
   a processor; and
   a memory, wherein the processor, when executing program instructions stored in the memory, is configured to:
   generate a training dataset based on a segmentation result value acquired by inputting a given medical image to a medical image segmentation deep-learning model; and
   acquire temporary weights using output data corresponding to primary learning by inputting good task data and bad task data sampled from primary learning training datasets to the medical image segmentation deep-learning model and update weights of the medical image segmentation deep-learning model by adding gradients acquired using weights acquired using output data corresponding to secondary learning by inputting the good task data and the bad task data sampled from the secondary learning training datasets to the medical image segmentation deep-learning model,
   wherein the primary learning and the secondary learning are repeated,
   wherein the generated training dataset comprises a good task training data and a bad task training data,
   wherein the good task training data and the bad task training data are generated from the one given medical image,
   wherein the generated good task training data and bad task training data are distributed and stored as the primary learning training datasets and the secondary learning training datasets, respectively, and
   wherein the good task data and bad task data sampled from the primary learning training datasets are sampled in ascending order with respect to segmentation performance,
   wherein the good task data and bad task data sampled from the secondary learning training datasets are sampled in ascending order with respect to segmentation performance.

2. The medical image segmentation deep-learning model generation apparatus of claim 1, wherein the good task training data comprises a new good task answer image generated by filling original answer pixels to the pixels which the medical image segmentation deep learning model predicted as correct answers, and a bad task answer image generated by filling original answer pixels to the pixels which the medical image segmentation deep-learning model predicted as wrong answers.

3. A medical image segmentation deep-learning model generation method comprising:
generating a training dataset based on a segmentation result value acquired by inputting a given medical image to a medical image segmentation deep-learning model;
sampling good task data and bad task data from primary learning training datasets;
acquiring temporary weights using output data corresponding to primary learning by inputting the good task data and the bad task data to the medical image segmentation deep-learning model;
sampling good task data and bad task data from secondary learning training datasets; and
updating weights of the medical image segmentation deep-learning model by adding gradients acquired using weights acquired using output data corresponding to secondary learning by inputting the good task data and the bad task data from the secondary learning training datasets to the medical image segmentation deep-learning model, wherein the sampling, the acquiring, and the sampling are sequentially repeated,
wherein the generated training dataset comprises a good task training data and a bad task training data,
wherein the good task training data and the bad task training data are generated from the one given medical image,
wherein the generated good task training data and bad task training data are distributed and stored as the primary learning training datasets and the secondary learning training datasets, respectively,
wherein the good task data and bad task data sampled from the primary learning training datasets are sampled in ascending order with respect to segmentation performance, and
wherein the good task data and bad task data sampled from the secondary learning training datasets are sampled in ascending order with respect to segmentation performance.

4. The medical image segmentation deep-learning model generation method of claim 3, wherein the good task training data comprises a new good task answer image generated by filling original answer pixels to the pixels which the medical image segmentation deep learning model predicted as correct answers, and a bad task answer image generated by filling original answer pixels to the pixels which the medical image segmentation deep-learning model predicted as wrong answers.

* * * * *